United States Patent
Cai et al.

(10) Patent No.: US 10,192,586 B2
(45) Date of Patent: Jan. 29, 2019

(54) INFORMATION ENTRY METHOD AND DEVICE

(71) Applicant: Huizhou University, Guangdong (CN)

(72) Inventors: Zhaoquan Cai, Guangdong (CN); Song Hu, Guangdong (CN); Hui Hu, Guangdong (CN); Yingxue Cai, Guangdong (CN); Jia Chen, Guangdong (CN)

(73) Assignee: HUIZHOU UNIVERSITY, Huizhou, Guangdong (CN)

( * ) Notice: Subject to any disclaimer, the term of this patent is extended or adjusted under 35 U.S.C. 154(b) by 0 days.

(21) Appl. No.: 15/493,320

(22) Filed: Apr. 21, 2017

(65) Prior Publication Data
US 2018/0294012 A1    Oct. 11, 2018

(30) Foreign Application Priority Data
Apr. 11, 2017 (CN) .......................... 2017 1 0232931

(51) Int. Cl.
*G10L 21/00*    (2013.01)
*G11B 27/10*    (2006.01)
(Continued)

(52) U.S. Cl.
CPC .......... *G11B 27/10* (2013.01); *A63B 24/0062* (2013.01); *G06F 3/167* (2013.01);
(Continued)

(58) Field of Classification Search
CPC ..................................................... G10L 15/06
(Continued)

(56) References Cited

U.S. PATENT DOCUMENTS 7,080,778 B1 * 7/2006 Kressin .................. G06Q 10/06
                                                    235/385
9,317,110 B2 * 4/2016 Lutnick .................. G06F 3/011
(Continued)

FOREIGN PATENT DOCUMENTS

CN       104184901 A     12/2014
CN       105516442 A      4/2016
CN       106302980 A      1/2017

OTHER PUBLICATIONS

The first Office Action from SIPO for Chinese Patent Application No. 201710232931.8.
(Continued)

*Primary Examiner* — Michael C Colucci
(74) *Attorney, Agent, or Firm* — Dragon Sun Law Firm, P.C.; Jinggao Li, Esq.

(57) ABSTRACT

The present disclosure provides an information entry method and a corresponding device. The method comprises: step a): acquiring in real-time motion data from a user companion device; step b): determining whether the device changes from a first motion status to a second motion status based on the motion data; if so, activating a recording module of the device; step c): recording in real-time the user's voice input through the recording module; step d): stopping recording according to a preset voice instruction of stopping recording. The method and device can address a need of information entry in the following scenario: when a user incidentally wants to record some audios during running or trotting, the device may quickly activate its own recording module based on the acquired motion data so as to enter information in an audio manner, without performing a touch operation on the companion device.

12 Claims, 2 Drawing Sheets

(51) Int. Cl.
  *G11B 20/10* (2006.01)
  *G06F 3/16* (2006.01)
  *G10L 15/26* (2006.01)
  *A63B 24/00* (2006.01)

(52) U.S. Cl.
  CPC ...... *G10L 15/265* (2013.01); *G11B 20/10527* (2013.01); *G11B 2020/10546* (2013.01)

(58) Field of Classification Search
  USPC .................................. 704/500, 243; 709/225
  See application file for complete search history.

(56) References Cited

U.S. PATENT DOCUMENTS

| | | | | |
|---|---|---|---|---|
| 2007/0080933 A1* | 4/2007 | Chen | ...................... | G06F 1/1632 |
| | | | | 345/156 |
| 2007/0130337 A1* | 6/2007 | Arnison | ..................... | G06F 3/16 |
| | | | | 709/225 |
| 2009/0192709 A1* | 7/2009 | Yonker | ................. | H04W 4/029 |
| | | | | 701/470 |
| 2012/0113019 A1* | 5/2012 | Anderson | ............. | G06F 1/1616 |
| | | | | 345/173 |
| 2012/0129460 A1* | 5/2012 | Hodis | ..................... | G01S 19/48 |
| | | | | 455/67.11 |
| 2014/0214421 A1* | 7/2014 | Shriberg | ................. | G10L 25/51 |
| | | | | 704/243 |
| 2015/0258301 A1* | 9/2015 | Trivedi | ................. | A61M 21/02 |
| | | | | 600/28 |
| 2016/0048866 A1* | 2/2016 | Li | ...................... | G06K 9/00604 |
| | | | | 705/14.41 |
| 2016/0357252 A1* | 12/2016 | Gavriliuc | ................ | G06F 3/012 |
| 2016/0366330 A1* | 12/2016 | Boliek | ................. | G06F 3/0484 |
| 2017/0025121 A1* | 1/2017 | Tang | ........................ | G10L 15/20 |
| 2017/0039045 A1* | 2/2017 | Abrahami | ................. | G06F 8/65 |
| 2017/0039358 A1* | 2/2017 | Yuen | ....................... | G06F 3/017 |
| 2017/0135611 A1* | 5/2017 | Chang | ................... | A61B 5/1116 |
| 2017/0173262 A1* | 6/2017 | Veltz | ..................... | A61M 5/1723 |

OTHER PUBLICATIONS

The second Office Action from SIPO for Chinese Patent Application No. 201710232931.8.

* cited by examiner

INFORMATION ENTRY METHOD AND DEVICE

FIELD OF THE INVENTION

The present disclosure relates to information processing, and more specifically, relates to an information entry method and device.

BACKGROUND OF THE INVENTION

In an era of information explosion, people's pace of life and work has become faster and faster. With emergence of smart terminals, information processing occupies one's much time, including fragmented time. On the other hand, people attach more importance to their personal health management than ever. Many people stick to a good body-building habit, e.g., regularly going to gym or running or trotting outdoors. So, during a personal bodybuilding process, how to exploit and manage fragmented time to efficiently process information becomes an issue to address.

SUMMARY OF THE INVENTION

The present disclosure provides an information entry method, comprising:

step a): acquiring in real-time motion data from a user companion device;

step b): determining whether the device changes from a first motion status to a second motion status based on the motion data; if so, activating a recording module of the device;

step c): recording in real-time the user's voice input through the recording module;

step d): stopping recording according to a preset voice instruction of stopping recording.

In addition, the present disclosure also provides a user companion device for information entry, comprising:

an acquiring unit configured to acquire in real-time motion data of the user companion device;

an activating unit configured to determine whether the device changes from a first motion status to a second motion status based on the motion data; if so, activate a recording module of the device;

a recording unit configured to record in real-time the user's voice input through the recording module;

a stopping unit configured to stop recording according to a preset voice instruction of stopping recording.

With the method and device, the present disclosure can address a need of information entry in the following scenario: when a user incidentally wants to record some audios during running or trotting, the device may quickly activate its own recording module based on the acquired motion data so as to enter information in an audio manner, without performing a touch operation on the companion device. Apparently, for current people who have an increasingly fast pace of work and life, as long as they have a need of recording audio information immediately even when they are running or trotting, the present disclosure may friendly and efficiently exploit such fragmented time, thereby providing a very friendly information entry solution.

BRIEF DESCRIPTION OF THE ACCOMPANYING DRAWINGS

DETAILED DESCRIPTION OF THE PREFERRED EMBODIMENTS

Hereinafter, technical solutions of various embodiments will be described with reference to preferred embodiments and relevant drawings so as to enable those skilled in the art to understand the technical solutions disclosed herein. The embodiments as described are only part, not all of the embodiments. The terms "first," "second" and the like used herein are for distinguishing different objects, not for describing specific sequences. Besides, the terms "comprise," "have" and any of their variations intend to cover and non-exclusively include. For example, a process, or method, or system, or product or device, which includes a series of steps or units, is not limited to the listed steps or units; optionally, they may also include other steps or units that are not listed; or optionally, they may also include other steps or units inherent in the process, method, system, product or device.

The term "embodiment" in this context means that a specific feature, structure or characteristic depicted in conjunction with the embodiment may be included within at least one embodiment of the present disclosure. Appearances of the phrase at various parts in the description do not necessarily refer to the same embodiments; nor are they separate or alternative embodiments that are mutually exclusive with other embodiments. Those skilled in the art may understand that the embodiments described herein may be combined with other embodiments.

Figure 1:
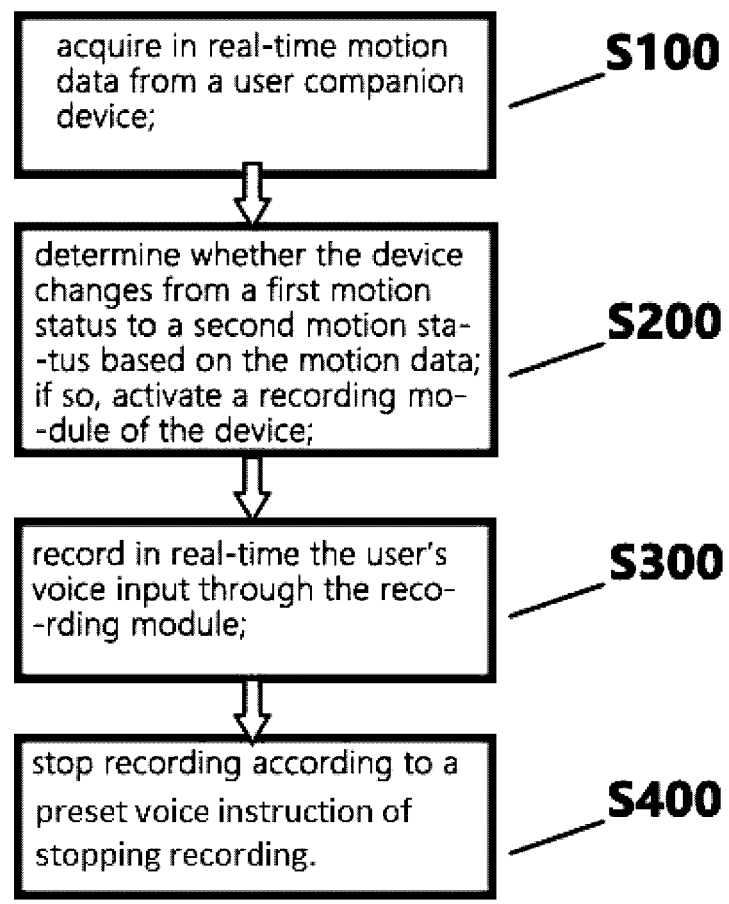
FIG. 1 is a flow diagram of an information entry method provided according to an embodiment of the present disclosure.

Refer to FIG. 1, in which a flow diagram of an information entry method provided according to an embodiment of the present disclosure is presented. As shown in the figure, the information entry method comprises:

Step S100: acquiring in real-time motion data from a user companion device;

Step S200: determining whether the device changes from a first motion status to a second motion status based on the motion data; if so, activating a recording module of the device;

Step S300: recording in real-time the user's voice input through the recording module;

Step S400: stopping recording according to a voice preset instruction of stopping recording.

This embodiment may implement convenient functions in the following scenarios:

When the user incidentally wants to record some audios during running or trotting, the companion device may quickly activate its recording module according to the obtained motion data to prepare for recording without a need of performing a touch operation on the device. When the user's motion status changes, the companion device also correspondingly changes from a first motion status into a second motion status.

Optionally, the first motion status corresponds to the user's running or trotting status, and the second motion status corresponds to the user's walking status or stopping status.

It may be seen that the recorded audio information may be an audio in an environment where the user is located, or an audio intended to be recorded by the user. Apparently, for current people with an increasingly fast pace of work and life, as long as he/she wants to immediately record audio information, the embodiment can friendly exploit the fragmented time, thereby providing a very friendly information entry method. In addition, because the embodiment activates the recording module as needed, rather than having the recording module always standby, the embodiment can also implement an efficient energy management for the recording module of the device.

Besides, optionally, the preset voice instruction of stopping recording may be a voice command, such as "Stop Recording" or "Recording Ends." It is noted that the voice instruction of stopping recording may also be other gesture instructions or other touch operation instructions, as long as the device supports gesture operations or other touch operations. Preferably, the voice command is preferred, because it exempts the user from a touch operation on the device. More preferably, the present disclosure allows the user to customize the preset voice instruction of stopping recording, e.g., the user records a piece of voice command as the voice instruction of stopping recording.

It may be seen that the step S100 may be implemented through a sensor of the device. Optionally, the sensor includes any one of the following or a combination thereof: an accelerometer, a velocimeter, a gyroscope, and a GPS module (or other positioning module).

Similarly, whether the motion status changes may be determined by a processor of the device based on the motion data, thereby implementing the step S200 using the processor. Further, when it is determined yes, the device activates the recording module through the processor.

It may be seen that the device may be a smart phone or a wearable device. The wearable device includes, a smart watch, a smart band, smart eyeglasses, etc. Typically, with the smart phone as an example, suppose it is needed to determine whether a change from the first motion status into the second motion status occurs based on the speed. Because the smart phone generally does not include a velocimeter, a speed within a certain time interval may be obtained by performing an integral operation on acceleration data sensed by the accelerometer. It belongs to prior art to calculate the speed by an accelerometer, a velocimeter, a gyroscope, a GPS module, and a processor. In the prior art, many running-related smart devices and relevant APPs can all calculate the running speed. All of these prior arts may be used for the present disclosure.

In another embodiment, after several seconds of performing the step S300, if the processor determines that currently there is no effective audio information being entered, the recording module of the device is turned off so as to lower unnecessary energy consumption. It is a very reasonable design, because the user is possibly only intended to slow down or rest a while, not intended to record any audio information.

In another embodiment, after the step S400 is performed, the method also comprises:

step S501, in which the device issues a Recording End confirmation alarm sound. This embodiment is to notify the user that the recording has been completed.

In a further embodiment, the step S100 comprises:

step S101: acquiring acceleration data of the user companion device is acquired in real-time; and/or, step S102: acquiring speed data of the user companion device in real-time; and/or step S103: acquiring direction data of the user companion device in real-time; and/or, step S104: acquiring position data of the user companion device in real-time.

The embodiment provides a plurality of motion data. These different kinds of motion data can all be used for step S200 to determine whether the device changes from the first motion status to the second motion status, and steps S101 to S104 may be used separately or in combination as needed:

1) When the acceleration data of the device is acquired, it is determined whether the device changes from a first instantaneous acceleration at a first time t1 to a second instantaneous acceleration at a second time t2; if so, it is determined that the device changes from the first motion status to the second motion status. Preferably, the first and second instantaneous accelerations have an apparent difference, and the second instantaneous acceleration and the second motion status have a correspondence relationship; more preferably, the acceleration data comes from the accelerometer;

2) When the speed data of the device is acquired, it is determined whether the device changes from a first average speed within a first preset time interval T1 to a second average speed within the first preset time interval T1; if so, it is determined that the device changes from the first motion status to the second motion status. Preferably, the first and second average speeds have an apparent difference, and the second average speed and the second motion status have a correspondence relationship; more preferably, as mentioned above, the speed data is calculated using an accelerometer, a gyroscope, a GPS module, and a processor.

3) When the direction data of the device is acquired, it is determined whether the device changes from always having direction changes within a second preset time interval T2 to almost having no direction changes within the second preset time interval T2; if so, it is determined that the device changes from the first motion status to the second motion status. Preferably, the device senses directions through a gyroscope.

4) It may be seen that the motion data may also be position data. When the position data of the device is acquired, it is determined whether the device changes from always having position changes within a third preset time interval T3 to almost having no position changes within the third preset time interval T3; if so, it is determined that the device changes from the first motion status to the second motion status. Preferably, the device senses position through a GPS module (or other positioning module);

More preferably, the first, second, and third preset time intervals may be identical time intervals, e.g., 2 seconds or 3 seconds, or customized otherwise; or may be different time intervals. Anyway, the settings should facilitate determination of whether the motion status changes.

In another embodiment, the step S200 of activating a recording module of the device comprises:

Step S201: detecting whether the device is shaken regularly; if so, activating the recording module of the device; otherwise, activating the recording module of the device according to a preset voice instruction of starting recording.

This embodiment implements a function similar to "shake" in a smart phone, corresponding to adding a trigger condition for activating the recording module. The trigger condition may be regularly shaking the device. Although this trigger condition adds an extra interaction for the user, it can make the user's operation more targeted, thereby avoiding unnecessary activation to the recording module, which reduces unnecessary energy consumption. By regularly shaking the device to activate the recording module, it is friendlier than activating the recording module through the preset voice instruction of starting recording.

Furthermore, optionally, if the preset voice instruction of starting recording is a voice command, a voice such as "Begin Recording" or "Record Begins" may be used as the voice command. It may be seen that besides the regular shaking and voice instruction indicated above, the voice instruction of starting recording may also be other gesture instructions or other touch operation instructions, as long as the device supports gesture operations or other touch operations. More preferably, the present disclosure allows customizing the preset voice instruction of starting recording, e.g., the user records a piece of voice command as the voice instruction of starting recording.

In another embodiment, the method further comprises:

Step S601: recognizing a Convert Audio Content instruction in the recording, and converting the recording content into textual content according to the Convert Audio Content instruction, and synchronizing the textual content to a calendar.

For this embodiment, similar to the voice instruction of starting recording and the voice instruction of stopping recording as indicated above, the Convert Audio Content instruction may be preset or customized, or may even classify the content, e.g., the user records different voice commands as the Convert Audio Content instruction. For example:

I) When a pair of Convert Audio Content instructions "Todo begins" and "Todo ends" appear in an audio sequentially, after remaining audio content between the audios "Todo begins" and "Todo ends" is recognized into a text, the text is synchronized to the "Todo Item" or "Todo List" in the calendar, thereby becoming a new todo item in the calendar, facilitating the user to access the calendar later to check, and alarming the user timely to handle it in time based on an alarm setting in the calendar;

II) When a pair of Convert Audio Content instructions, i.e., voices "Shopping begins" and "Shopping ends," appear sequentially in an audio, after the remaining audio content between the voices "Shopping begins" and "Shopping ends" is recognized into a text, the text is synchronized to the "Todo item" or "Shopping list" of the calendar, thereby becoming a newly added to-do shopping item in the calendar, facilitating the user to access the calendar later to check, and alarming the user timely to buy it in time based on an alarm setting in the calendar;

It may be seen that the calendar is surely supported by the device. Lookup of the calendar may be performed at the device side. Or, the device may be connected to a PC, a laptop computer, or a smart phone so as to look up the calendar at the PC, laptop computer, or smart phone side.

Further, not limited to the calendar, in another embodiment, the method further comprises:

Step S701: recognizing a Convert Audio Content instruction in a recording, converting the recording content into textual content according to the Convert Audio Content instruction, and synchronizing the textual content to a notepad. For example:

When a pair of Convert Audio Content instructions, i.e., voices "Idea begins" and "Idea ends," appear sequentially in the audio, after the remaining audio content between the voices "Idea begins" and "Idea ends" is recognized into a text, the text is synchronized to a "New note" of the notepad or memo, thereby becoming a newly added incidental idea record in the notepad, facilitating the user to access the notepad or memo later to check as well as to further sort and perfect.

In other words, the present disclosure also discloses a plurality of embodiments, which may effectively exploit the user's bodybuilding time or exercise time, such that when the user pauses or terminates his/her exercise, after friendly and quickly starting the recording function to enter information, the to-do item, shopping item or contingent idea can also be further recognized into a text which will be synchronized to an appropriate application (e.g., calendar, notepad, memo), facilitating the user to subsequently further manage such information.

In another embodiment, the method further comprises:

Step S801: recognizing a Convert Audio Content instruction in a recording, converting recording content into textual content according to the Convert Audio Content instruction, converting an original audio file into an MP3 format, and converting the textual content into an RLC format, thereby facilitating subsequent sharing of the audio recorded by the user.

For the Convert Audio Content instruction in relevant embodiments, it may be converted into a text or may not be converted into a text. In principle, in view that relevant instructions possibly affect reading of relevant textual content, it is preferably considered not to convert.

Figure 2:
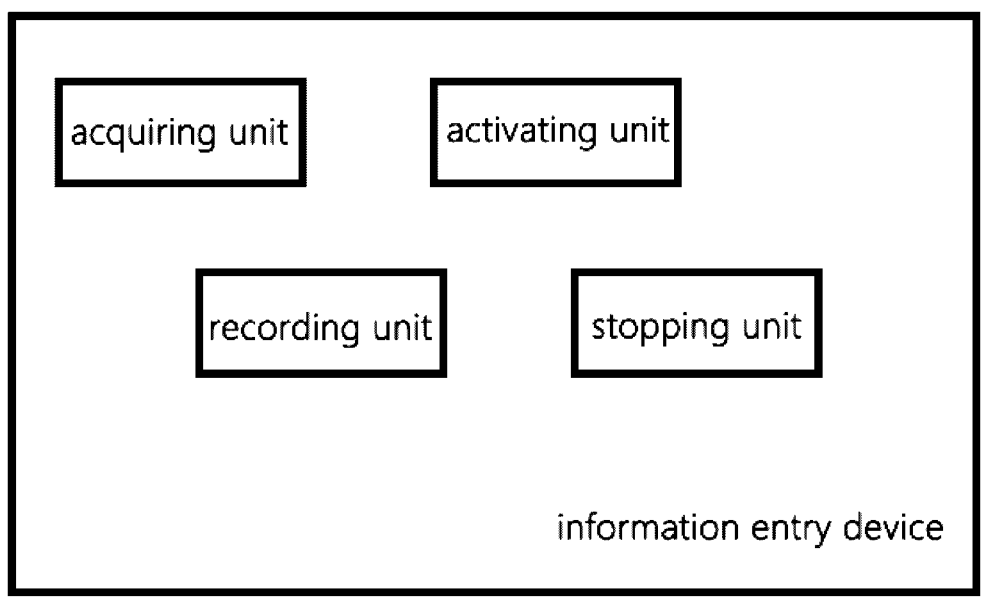
FIG. 2 is a structural diagram of a user companion device for information entry provided in an embodiment of the present disclosure.

Further, refer to FIG. 2, in which a user companion device for information entry is disclosed in another embodiment is presented. The user companion device comprises:

an acquiring unit configured to acquire in real-time motion data of the user companion device;

an activating unit configured to determine whether the device changes from a first motion status to a second motion status based on the motion data; if so, activate a recording module of the device;

a recording unit configured to record in real-time the user's voice input through the recording module;

a stopping unit configured to stop recording according to a preset voice instruction of stopping recording.

This embodiment may implement convenient functions in the following scenarios:

When the user incidentally wants to record some audios during running or trotting, the device may quickly activate its recording module according to the obtained motion data to prepare for recording, without a need of performing a touch operation on the device. When the user's motion status changes, the device also correspondingly changes from a first motion status into a second motion status.

Optionally, the first motion status corresponds to the user's running or trotting status, and the second motion status corresponds to the user's walking status or stopping status.

It may be seen that the recorded audio information may be an audio in an environment where the user is located, or an audio intended to be recorded by the user. Apparently, for current people with an increasingly fast pace of work and life, as long as he/she wants to immediately record audio information, the embodiment can friendly exploit the fragmented time and thereby provide a very friendly information entry method. In addition, because the embodiment activates the recording module as needed, rather than having the recording module always standby, the embodiment can also implement an efficient energy management for the recording module of the device.

Besides, optionally, the preset voice instruction of stopping recording may be a voice command, such as "Stop Recording" or "Recording Ends." It is noted that the voice instruction of stopping recording may also be other gesture instructions or other touch operation instructions, as long as the device supports gesture operations or other touch operations. Preferably, the voice command is preferred, because it exempts the user from a touch operation on the device. More preferably, the present disclosure allows the user to customize the preset voice instruction of stopping recording, e.g., the user records a piece of voice command as the voice instruction of stopping recording.

It may be seen that a sensor of the device may be used as the acquiring unit. Optionally, the sensor includes any one of the following or a combination thereof: an accelerometer, a velocimeter, a gyroscope, and a GPS module (or other positioning module).

Similarly, whether the motion status changes may be determined by a processor of the device based on the motion data, thereby implementing the activating unit using the processor. Further, when it is determined yes, the device activates the recording module through the processor.

It may be seen that the device may be a smart phone or a wearable device. The wearable device includes a smart watch, a smart band, smart eyeglasses, etc. Typically, with the smart phone as an example, suppose it is needed to determine whether a change from the first motion status into the second motion status occurs based on speed. Because the smart phone generally does not include a velocimeter, a speed within a certain time interval may be obtained by performing an integral operation on acceleration data sensed by the accelerometer. It belongs to prior art to calculate the speed by an accelerometer, a velocimeter, a gyroscope, a GPS module, and a processor. In the prior art, many running-related smart devices and relevant APPs can all calculate the running speed. All of these prior arts may be used for the present disclosure.

In another embodiment, after the recording unit works for several seconds, if the processor determines that currently there is no effective audio information being recorded, the recording module of the device is turned off so as to lower unnecessary energy consumption. It is a very reasonable design, because the user is possibly only intended to slow down or rest a while, not intended to record any audio information.

In another embodiment, the device further comprises:

an alarming unit configured to issue a Recording End confirmation alarm sound. This embodiment is to notify the user that the recording has been completed.

In a further embodiment, the acquiring unit comprises:

an acceleration acquiring unit configured to acquire acceleration data of the user companion device in real-time; and/or, a speed acquiring unit configured to acquire speed data of the user companion device in real-time; and/or a direction acquiring unit configured to acquire direction data of the user companion device in real-time; and/or, a position acquiring unit configured to acquire position data of the user companion device in real-time.

As far as the embodiment is concerned, a plurality of motion data acquiring units are provided. These different kinds of motion data acquiring units can all provide data to the determining unit for determining whether the device changes from the first motion status to the second motion status. The acceleration acquiring unit, the speed acquiring unit, the direction acquiring unit, and the position acquiring unit may be used separately or in combination as needed:

D1) When acquiring acceleration data of the device, the acceleration acquiring unit determines whether the device changes from a first instantaneous acceleration at a first time t1 to a second instantaneous acceleration at a second time t2; and if so, determines that the device changes from the first motion status to the second motion status. Preferably, the first and second instantaneous accelerations have an apparent difference, and the second instantaneous acceleration and the second motion status have a correspondence relationship; more preferably, the acceleration data comes from an accelerometer that is included in the acceleration acquiring unit;

D2) When acquiring speed data of the device, the speed acquiring unit determines whether the device changes from a first average speed within a first preset time interval T1 to a second average speed within the first preset time interval T1; and if so, determines that the device changes from the first motion status to the second motion status. Preferably, the first and second average speeds have an apparent difference, and the second average speed and the second motion status have a correspondence relationship; more preferably, as mentioned above, the speed data is calculated using an accelerometer, a velocimeter, a gyroscope, a GPS module, and a processor. The speed acquiring unit at least comprises any one of the following or a combination thereof: the accelerometer, the gyroscope, and the GPS module; according to actual needs, the speed acquiring unit may also comprise a processor when needing other computing resources;

D3) When acquiring the direction data of the device, the direction acquiring unit determines whether the device changes from always having direction changes within a second preset time interval T2 to almost having no direction changes within the second preset time interval T2; and if so, determines that the device changes from the first motion status to the second motion status. Preferably, the device senses directions through a gyroscope that is included in the direction acquiring unit;

D4) It may be seen that the motion data may also be position data. When acquiring the position data of the device, the position acquiring unit determines whether the device changes from always having position changes within a third preset time interval T3 to almost having no position changes within the third preset time interval T3; and if so, determines that the device changes from the first motion status to the second motion status. Preferably, the device senses position through a GPS module (or other positioning module) that is included in the position acquiring unit;

More preferably, the first, second, and third preset time intervals may be identical time intervals, e.g., 2 seconds or 3 seconds, or customized otherwise; or may be different time intervals. Anyway, the settings should facilitate determination of whether the motion status changes. Besides, it may be seen that change of the motion statuses is not limited to the scenarios as listed in D1) to D4).

In another embodiment, the device also comprises:

a triggering module configured to detect whether the device is shaken regularly; if so, activate the recording module of the device; otherwise, activate the recording module of the device according to a preset voice instruction of starting recording.

This embodiment implements a function similar to "shake" in a smart phone, corresponding to adding a trigger condition for activating the recording module. The trigger condition may be regularly shaking the device. Although this trigger condition adds an extra interaction for the user, it can make the user's operation more targeted, thereby avoiding unnecessary activation to the recording module, which reduces unnecessary energy consumption. By regularly shaking the device to activate the recording module, it is friendlier than activating the recording module through the preset voice instruction of starting recording.

Furthermore, optionally, if the preset voice instruction of starting recording is a voice command, a voice such as "Begin Recording" or "Record Begins" may be used as the voice command. It may be seen that besides the regular shaking and voice instruction indicated above, the voice instruction of starting recording may also be other gesture instructions or other touch operation instructions, as long as the device supports gesture operations or other touch operations. More preferably, the present disclosure allows customizing the preset voice instruction of starting recording, e.g., the user records a piece of voice command as the voice instruction of starting recording.

In another embodiment, the device further comprises:

a synchronizing module configured to recognize a Convert Audio Content instruction in the recording, convert the recording content into textural content according to the Convert Audio Content instruction, and synchronize the textual content to a calendar.

For this embodiment, similar to the voice instruction of starting recording and the voice instruction of stopping recording as indicated above, the Convert Audio Content instruction may be preset or customized, or may even classify the content, e.g., the user records different voice commands as the Convert Audio Content instruction. For example:

A) When a pair of Convert Audio Content instructions "Todo begins" and "Todo ends" appear sequentially in the audio, after the remaining audio content between the audios "Todo begins" and "Todo ends" is recognized into a text, the text is synchronized to the "Todo item" or "Todo List" in the calendar, thereby becoming a new todo item in the calendar, facilitating the user to access the calendar later to check, and alarming the user timely to handle it in time based on an alarm setting in the calendar;

B) When a pair of Convert Audio Content instructions, i.e., voices "Shopping begins" and "Shopping ends," appear sequentially in the audio, after the remaining audio content between the voices "Shopping begins" and "Shopping ends" is recognized into a text, the text is synchronized to the "Todo item" or "Shopping list" of the calendar, thereby becoming a newly added to-do shopping item in the calendar, facilitating the user to access the calendar later to check, and alarming the user timely to buy it in time based on an alarm setting in the calendar;

It may be seen that the calendar is surely supported by the device. Lookup of the calendar may be performed at the device side. Or, the device may be connected to a PC, a laptop computer, or a smart phone so as to look up the calendar at the PC, laptop computer, or smart phone side.

Further, not limited to the calendar, in another embodiment, the synchronizing module is also configured to recognize a Convert Audio Content instruction in a recording, convert the recording content into textual content according to the Convert Audio Content instruction, and synchronize the textual content to a notepad. For example:

When the pair of audio content instructions, i.e., voices "Idea begins" and "Idea ends," appear sequentially in the audio, after the remaining audio content between the voices "Idea begins" and "Idea ends" is recognized into a text, the text is synchronized to a "New note" of the notepad or memo, thereby becoming a newly added incidental idea record in the notepad, facilitating the user to access the notepad or memo later to check as well as to further sort and perfect.

In other words, the present disclosure also discloses a plurality of embodiments, which may effectively exploit the user's bodybuilding time or exercise time, such that when the user pauses or terminates his/her exercise, after friendly and quickly starting the recording function to enter information, the to-do item, shopping item or contingent idea can also be further recognized into texts which will be synchronized to an appropriate application (e.g., calendar, notepad, memo), facilitating the user to subsequently further manage such information.

In another embodiment, the device further comprises a file converting module configured to recognize a Convert Audio Content instruction in a recording, convert recording content into textual content according to the Convert Audio Content instruction, convert an original audio file into an MP3 format, and convert the textual content into an RLC format, which facilitates subsequent sharing of the audio recorded by the user.

For the Convert Audio Content instruction in relevant embodiments, it may be converted into a text or may not be converted into a text. In principle, in view that relevant instructions possibly affect reading of relevant textual content, it is preferably considered not to convert.

The device above may comprise: at least one processor (e.g., CPU), at least one sensor (e.g., an accelerometer, a gyroscope, a GPRS module or other positioning module), at least one memory, at least one communication bus, and at least one microphone, wherein the communication bus is for implementing connection and communication between respective components, and the microphone is for collecting audio input. The device may further comprise at least one receiver and at least one transmitter, wherein the receiver and the transmitter may be a wired transmit port or a wireless device (e.g., including antenna units), for signaling or data transmission with other node devices. The memory may be a high-speed RAM memory or a non-volatile memory, e.g., at least one disk memory. The memory optionally may be a storage unit remote from the processor. The memory stores a set of program codes, and the processor may invoke codes stored in the memory to perform corresponding functions through a communication bus.

An embodiment of the present disclosure also provides a computer storage medium, wherein the computer storage program may store a program that, when being executed, includes part or all of the steps of any information entry method as disclosed in the method embodiments.

The steps in the method according to the embodiments of the present disclosure may be subject to sequence adjustment, merge or delete according to actual needs.

The units in the device according to the embodiments of the present disclosure may be subject to merge, partition and deletion according to actual needs. It needs to be noted that for respective method embodiments mentioned above, they are all depicted as a combination of a series of actions at the ease of depiction. However, those skilled in the art should know that the present disclosure is not limited by the action sequences as described, because according to the present disclosure, some steps may be performed in other sequences or concurrently. Secondly, those skilled in the art should know that the embodiments as depicted in the specification are all preferred embodiments, and the involved actions, modules, and units are not necessarily essential to the present disclosure.

The embodiments above are each depicted with a specific focus, such that a part that is not elaborated in one embodiment may refer to relevant depictions in other embodiments.

In several embodiments as provided in the present disclosure, it should be understood that the disclosed device may be implemented in other manners. For example, the device embodiments as depicted above are only illustrative. For example, partitioning of the units is only a logical function partition; in practical implementations, there may exist other partitioning manners, e.g., a plurality of units or components may be combined or integrated into another system, or some features may be omitted or may not be executed. Coupling, direct coupling or communication connection between respective units or components may be implemented through some interfaces; indirect coupling or communication connection between modules or units may be implemented electrically or otherwise.

Units that are described as discrete components may be or may not be physically detached; they may be located in one place or may be distributed onto a plurality of network units. Part or all of the units therein may be selected according to actual needs to achieve the objective of the solution of the present embodiment.

In addition, respective functional units in respective embodiments of the present disclosure may be integrated in one processing units; the respective units may be physically existent separately; or two or more units may be integrated into one unit. The integrated unit may be implemented in a form of hardware, or implemented in a form of a software functional unit.

The integrated unit, if implemented in the form of a software functional unit and sold or exploited as an independent product, may be stored in a computer-readable storage medium. Based on such understanding, the technical solution of the present disclosure essentially, or the portion contributing to the prior art, or part or the entirety of the technical solution, may be embodied in the form of a software product. The computer software product, which is stored in a storage medium and includes a plurality of instructions, causes a computer device (which may be a smart phone, a personal digital assistant, a wearable device, a laptop computer, or a tablet computer) to perform all or part of steps of the method according to respective embodiments of the present disclosure. The storage medium mentioned above comprises: a U disk, a ROM (read-only memory), a RAM (random access memory), a mobile hard disk, a magnetic disk, or an optical disk, and various other mediums that may store program codes.

The embodiments above are only for illustrating, rather than limiting, the technical solutions of the present disclosure. Although the present disclosure has been illustrated in detail with reference to the above embodiments, those skilled in the art should understand that the technical solutions as disclosed in the respective embodiments may be modified, or part of technical features therein may be equivalently substituted; while these amendments or substitutions do not cause the essence of the corresponding technical solution to depart from the scope of the technical solutions of respective embodiments of the present disclosure.

The invention claimed is:

1. An information entry method, comprising:
   step a): acquiring in real-time motion data from a device comprising a sensor, a processor, a recorder and a microphone, wherein the sensor comprises (i) an accelerometer to detect an acceleration of a user, (ii) a velocimeter to sense a speed of the user, (iii) a gyroscope to sense a direction of the user, and (iv) a GPS component to sense a position of the user;
   step b): determining, executed by the processor, whether the device detects a change from a first motion status at a first time interval to a second motion status at a second time interval based on the motion data from the sensor, wherein the change comprises differences in (a) the acceleration of the user, (b) the speed of the user, (c) the direction of the user and (d) the position of the user; if so, activating, executed by the processor, the recorder of the device when (1) each of the differences is larger than a respective predetermined threshold and (2) the device is shaken regularly, thereby activating the recorder to prepare for recording without performing a touch operation on the device;
   wherein the differences include:
   (A) acceleration data change when the device changes from a first instantaneous acceleration at a first time t1 to a second instantaneous acceleration at a second time t2;
   (B) speed data change when the device changes from a first average speed within the first time interval to a second average speed within the first time interval;
   (C) direction data change when the device changes from having direction changes within the second time interval to having no direction changes within the second time interval; and
   (D) position data change when the device changes from having position changes within a third time interval to having no position changes within the third time interval;
   wherein the acceleration data change, the speed data change, the direction data change and the position data change are acquired in real time; and
   wherein shaking of the device corresponds to adding a trigger condition for activating the recording module, and the trigger condition adds an extra interaction for the user, thereby avoiding unnecessary activation to the recorder and reducing unnecessary energy consumption,
   step c): recording in real-time user's voice input through the recorder of the device;
   step d): stopping recording according to a preset voice instruction of stopping recording, wherein the preset voice instruction of stopping recording is collected through the microphone of the device;
   wherein the first motion state corresponds to a running or trotting status of the user, and the second motion status corresponds to a walking status of the user.

2. The information entry method according to claim 1, wherein the step a) comprises:
   step a1): acquiring acceleration data of the device in real-time; and/or,
   step a2): acquiring speed data of the device in real-time; and/or
   step a3): acquiring direction data of the device in real-time; and/or,
   step a4): acquiring position data of the device in real-time.

3. The information entry method according to claim 1, wherein activating the recorder of the device in step b) comprises:
   step b1: detecting whether the device is shaken regularly; if so, activating the recorder of the device; otherwise, activating the recorder of the device according to the preset voice instruction of starting recording.

4. The information entry method according to claim 1, further comprising:
   step e): recognizing a Convert Audio Content instruction in a recording, converting recording content into textual content according to the Convert Audio Content instruction, and synchronizing the textual content to a calendar or notepad.

5. The information entry method according to claim 1, wherein
   the change comprises the differences in the acceleration, the speed, the direction and the position; and
   when each of the differences is larger than a first respective predetermined threshold, the recorder of the device is activated, executed by the processor, to prepare for recording without performing the touch operation on the device.

6. The information entry method according to claim 5, wherein the first time interval is identical to the second time interval.

7. A device for information entry, comprising:
a sensor, wherein the sensor comprises (i) an accelerometer to detect an acceleration of a user, (ii) a velocimeter to sense a speed of the user, (iii) a gyroscope to sense a direction of the user, and (iv) a GPS component to sense a position of the user;
a processor, configured to:
acquire in real-time motion data from the device;
determine whether the device detects a change from a first motion status at a first time interval to a second motion status at a second time interval based on the motion data, wherein the change comprises differences in (a) the acceleration of the user, (b) the speed of the user, (c) the direction of the user and (d) the position of the user; if so, activate a recorder of the device when (1) each of the differences is larger than a respective predetermined threshold and (2) when the device is shaken regularly, thereby activating the recorder to prepare for recording without performing a touch operation on the device;
wherein the differences include:
(A) acceleration data change when the device changes from a first instantaneous acceleration at a first time t1 to a second instantaneous acceleration at a second time t2;
(B) speed data change when the device changes from a first average speed within the first time interval to a second average speed within the first time interval;
(C) direction data change when the device changes from having direction changes within the second time interval to having no direction changes within the second time interval; and
(D) position data change when the device changes from having position changes within a third time interval to having no position changes within the third time interval;
wherein the acceleration data change, the speed data change, the direction data change and the position data change are acquired in real time; and
wherein shaking of the device corresponds to adding a trigger condition for activating the recording module,
and the trigger condition adds an extra interaction for the user, thereby avoiding unnecessary activation to the recorder and reducing unnecessary energy consumption,
record in real-time user's voice input through the recorder;
stop recording according to a preset voice instruction of stopping recording; and
a microphone, wherein the microphone collects the preset voice instruction of stopping recording;
wherein the first motion state corresponds to a running or trotting status of the user, and the second motion status corresponds to a walking status of the user.

8. The device according to claim 7, wherein the processor is further configured:
acquire acceleration data of the device in real-time; and/or,
acquire speed data of the device in real-time; and/or
acquire direction data of the device in real-time; and/or,
acquire position data of the device in real-time.

9. The device according to claim 8, wherein the processor is further:
configured to detect whether the device is shaken regularly; if so, activate the recorder of the device; otherwise, activate the recorder of the device according to a preset voice instruction of starting recording.

10. The device according to claim 8, wherein the processor is further
configured to recognize a Convert Audio Content instruction in a recording, convert recording content into textual content according to the Convert Audio Content instruction, and synchronize the textual content to a calendar or notepad.

11. The device according to claim 7, wherein
the change comprises the differences in the acceleration, the speed, the direction and the position; and
when each of the differences is larger than a first respective predetermined threshold, the recorder of the device is activated, executed by the processor, to prepare for recording without performing the touch operation on the device.

12. The device according to claim 11, wherein the first time interval is identical to the second time interval.

* * * * *